June 22, 1948.　　　J. H. ROUNTREE　　　2,443,710

METHOD OF FLAME CUTTING METAL PLATES AND FORMING SHAPED EDGES THEREON

Filed April 29, 1943

INVENTOR
JOHN H. ROUNTREE
BY
E. Greenewald
ATTORNEY

Patented June 22, 1948

2,443,710

UNITED STATES PATENT OFFICE 2,443,710

METHOD OF FLAME-CUTTING METAL PLATES AND FORMING SHAPED EDGES THEREON

John H. Rountree, Plainfield, N. J., assignor to The Linde Air Products Company, a corporation of Ohio Application April 29, 1943, Serial No. 485,011

11 Claims. (Cl. 148—9)

This invention generally relates to the art of cutting metal by an improved oxygen cutting method and in particular relates to cutting, beveling and squaring edges of relatively thick steel plates, or the like, by such method, although the purview of the invention in its broader aspects includes the application of the method to the cutting of various shapes of steel or metal members, where it is desired to impart certain predetermined edge contours thereto. The method is particularly adapted for use in the sizing and shaping of rolled homogeneous armor plate for subsequent welding operations.

Heretofore, in the preparation of plate members for subsequent welding operations, it has been customary to utilize conventional tractor-type, straight line and template following contour shape cutting machines, and when these machines were equipped with the usual type cutting equipment including a single standard cutting blowpipe, operations were limited to cutting a single edge face in one pass. The particular size and shape of plate members having been cut out, one or more beveling operations were usually desirable so that the edges of the plate might be given a plurality of faces, with a view toward efficient butt welding, and so in such operations a plurality of passes were necessary.

Subsequently, cutting of a plurality of faces, usually including at least one beveled face and an unbeveled nose face, was accomplished in the preparation of such plate member edges, by an improved method termed "multi-faced cutting." This method involved the use of a series of cutting nozzles incorporated in a suitably arranged fixture and so arranged that a required edge contour composed of a plurality of faces could be cut with a single passage of the cutting equipment. Such equipment conventionally included a group or cluster of nozzles, each arranged at predetermined angles to the others, oxygen and acetylene gas supplying equipment therefor and plate riding equipment on the work with means for relating the same to a proper line of contour.

However, in the use of such equipment adapted for multi-faced cutting in a single pass, it has been found that in the preparing of relatively thick steel plates, such as one inch in thickness or greater for subsequent welding operations, by forming the edges with a double bevel and an intermediate unbeveled nose face, difficulties have been encountered due to the squaring-off jet being deflected by the scrap side of the under bevel kerf wall and resulting in the formation of gouges in the under bevel face. It has been found that the more heat that is dissipated from the zone of the under bevel kerf walls, the more difficult it is to make intersecting cuts therethrough. Such difficulties are particularly encountered when the angle of the kerf forming the lower or under bevel is equal to or less than 45°, since, when the angle of intersection is more acute, there is more likelihood that the following jet will re-enter the kerf wall of a preceding jet; when the angle of intersection is greater than 45°, preheating presents the major difficulty as there is a tendency for the preheating flames to be deflected.

Accordingly, the principal objects of the present invention are to provide a high speed and accurate method of oxygen cutting plate edges to form a predetermined multi-faced contour; to arrange a group of connected cutting nozzles so that an improved sequence of cuts is attained in plate edge preparation; to provide, in such operations, an auxiliary cut, thereby to produce a heated metal fin or membrane, which fin, before its removal creates a heated area within the limits of which a second cut is made; to provide in such cutting operations such a heated fin so that a squaring cut may be made therethrough without deflection of the oxygen jet utilized in making such squaring cut, into a bevel cut already made; to provide a new and improved series of cuts in such plate edge preparation, so that cuts intersecting within the upper and lower limits of the plate may readily be utilized. These and other objects of the invention will become apparent from the following description taken in connection with the accompanying illustration figures, which are not to be deemed limitative thereof.

Figures 3, 4:
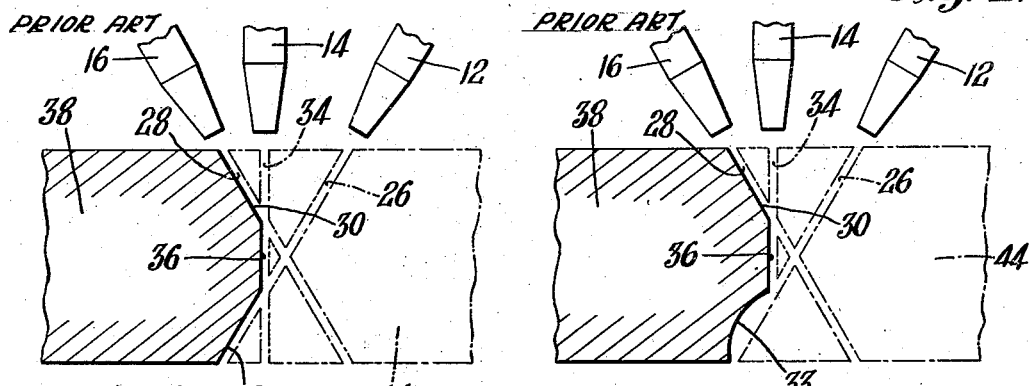
Figure 5:
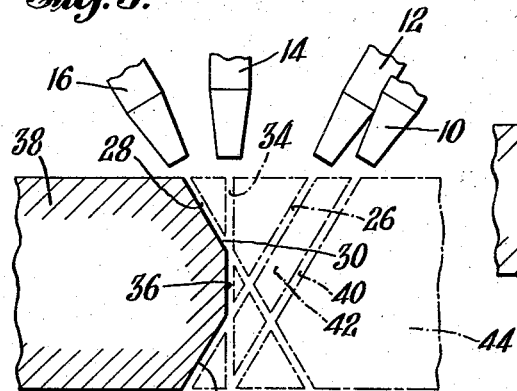

Fig. 3 semi-diagrammatically illustrates in section a series of kerfs and a desired edge contour in respect to a steel plate;

Fig. 4 semi-diagrammatically illustrates in section the result of an attempt to produce the cuts illustrated in Fig. 3, showing the deflection of cutting oxygen from a desired line of cut by a kerf already made, with resultant gouging of a kerf wall of the latter;

Fig. 5 semi-diagrammatically illustrates a method of attaining the desired edge contour illustrated in Fig. 3, by employing an auxiliary kerf, to provide a heated membrane or fin through which the squaring cut can be made without deflection.

Figure 6:
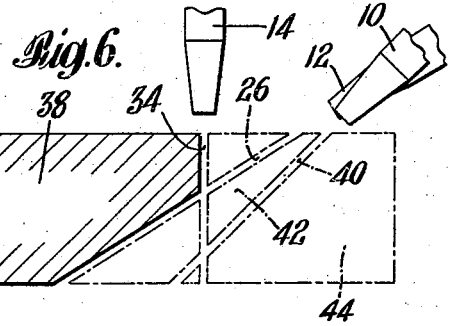

Fig. 6 semi-diagrammatically illustrates a particularly advantageous application of the principle of the invention to an under bevel kerf having an angle of greater than 45°.

The essence of the invention resides in making a preliminary and auxiliary kerf in the scrap metal outside of the final plate edge being prepared, which auxiliary kerf serves to prevent the dissipation of heat by conduction to the scrap, and then making an inner adjacent kerf approximately parallel thereto. By virtue of the heat thus applied and conserved in cutting such two mutually non-intersecting kerfs through the plate and forming a heated metal fin or membrane between these kerfs, the making of additional planar squaring or beveling kerfs which extend through the said fin, or adjacent thereto, is greatly facilitated and accelerated, without tending to deflect the oxygen jet or jets utilized in making such latter kerfs, into formerly made intersecting kerfs.

Referring to the drawings, a fixture B holding a cluster of cutting nozzles 10, 12, 14, and 16 will preferably be adjustably and slidably arranged in a conventional manner, as indicated, relative to a central bracket member 18. These nozzles will normally be of the usual type, each supplying a mixture of oxygen and acetylene for one or more preheating flames, and also adapted to supply a central jet of oxygen for cutting through the metal body. In the cutting process, an exothermic reaction is ordinarily set up between the heated metal and the oxygen. The central bracket member 18 may be controlled by an overhead guide arm 20 which guide arm will be normally guided by an orthodox tractor-type straight line or template following contour shape cutting machine (not shown). Also, central bracket member 18 may be arranged with a depending spacing arm 22 which latter at its lower end is provided with a plate follower wheel 24 thus providing a conventional plate riding assembly in this type of apparatus. The nozzles 10, 12, 14, and 16, as indicated particularly in Fig. 2, are arranged to cut concurrently but in sequence, one following the other, along the adjacent parallel paths on the same surface of a steel plate, thus to give a plate or plate member a desired shape and size, and also to give a particular multi-faced edge contour, as desirable or required for subsequent butt welding operations.

Figure 1:
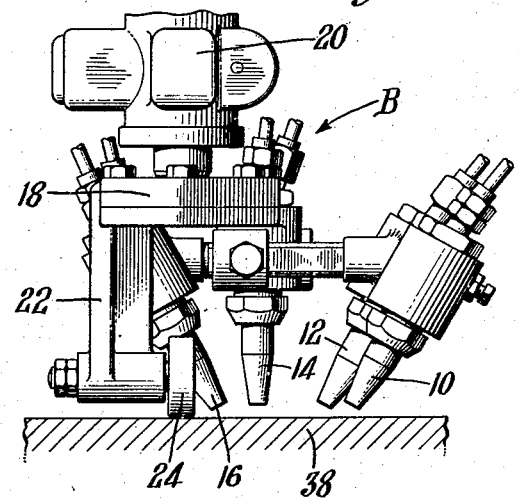
Fig. 1 is an end elevation of a cutting fixture including four cutting nozzles each adjustably positioned in respect to the other, a plate riding attachment and control means therefor, and a steel work plate, indicated partially.
Figure 2:
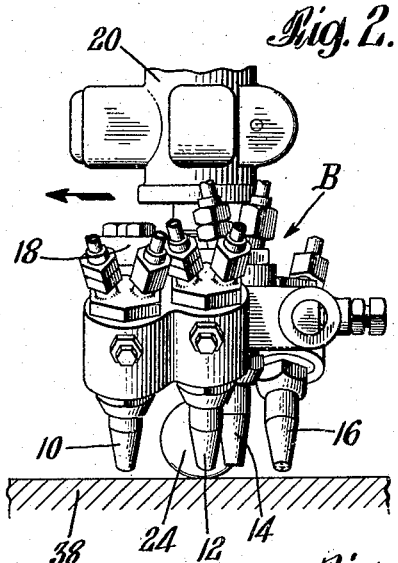
Fig. 2 is a side elevation of Fig. 1.

The apparatus of Figs. 1 and 2 includes a group or cluster B of nozzles 10, 12, 14, and 16 wherein nozzles 12 and 16 are each directed and arranged in a conventional manner to cut kerfs 26 and 28, thus providing lower and upper bevel faces 32 and 30, and furthermore wherein nozzle 14 is arranged to cut a perpendicular kerf 34, thus to provide a square or unbeveled nose face 36 upon steel plate 38 as indicated in Fig. 3. With this arrangement it is usual for nozzle 12 to lead and make the first kerf identified as 26; for nozzle 14 to follow and make the second kerf identified as 34; and for nozzle 16 to trail and form the last kerf, identified as 28. However, in conducting this type of operation, the cutting oxygen jet from nozzle 14 usually is deflected by the under bevel kerf 26 already cut by nozzle 12, with the result that the lower bevel face 32 is gouged out as indicated at 33 in Fig. 4, or may be pitted and scarred dependent upon the speed of operation.

Accordingly, the invention in this particular embodiment involves cutting an auxiliary kerf 40 (see Fig. 5 particularly) by the cutting oxygen jet discharged from the auxiliary cutting nozzle 10 which is placed in leading position, ahead of nozzle 12, and otherwise nozzles 12, 14, and 16 follow the sequence described above. The auxiliary kerf 40 provides an intermediate isolated membrane or fin 42 in the waste or scrap metal identified as 44; also the kerf 40 prevents the dissipation of heat from membrane 42 into waste metal 44, otherwise normally flowable thereto by conduction. Since membrane 42 lies between kerfs 26 and 40 in plate 38, it will be realized that considerable heat is applied and conserved in said auxiliary metal membrane or fin 42, maintaining the same at a temperature at which it is more easily penetrated in cutting the squaring kerf 34.

In other words, the existence of membrane 42 sufficiently retards the dissipation, by conduction, of the exothermic heat so that the membrane metal is at a great enough temperature for ready cutting, with the result that the tendency for the deflection of the oxygen jet emanating from nozzle 14 in cutting kerf 34, is eliminated, or sufficiently minimized so that it will not interfere with the production of a properly finished edge face 32.

Fig. 5 may be said to illustrate a relatively thick two (2) inch steel plate of rolled homogeneous armor plate stock wherein auxiliary kerf 40 is separated from subsequent kerf 26 by one-quarter (¼) to three-eighths (⅜) of an inch, although the latter distance ordinarily will vary dependent upon the speed of operation and the volume of oxygen in the cutting jet. It will be noted that in this instance said kerfs 40 and 26 are indicated as being in approximately parallel planes. It is within the concept of this invention that the auxiliary kerf 40 may conceivably accomplish a useful purpose, as for example the cutting of a kerf for a second adjacent plate of metal being prepared, and it is understood that such an embodiment of the invention is within the scope of the appended claims.

In Fig. 6, a particular adaptation of my invention is illustrated diagrammatically, and particularly pertains to the cutting of a wide angle under bevel kerf, namely, as illustrated, an angle of greater than 45°. In describing this figure common reference numerals have been utilized to designate common parts or kerfs as above described in connection with Figs. 1–5. Such wide angle kerfs are relatively more time consuming inasmuch as they require a greater thickness of metal to be cut, and therefore may be said to allow greater time for the dissipation of heat into the scrap metal; accordingly, since the marginal portions of the scrap are less heated, such marginal portions present a greater barrier to the penetration of the oxygen jet emanating from the nozzle 14 in cutting kerf 34. Accordingly, in cutting such multi-faced edge contours as illustrated in Fig. 6, an auxiliary cutting nozzle 10 will be used to form an auxiliary kerf 40 which precedes kerf 26. The oxygen cutting streams discharged by nozzles 10 and 12 desirably are spaced apart in the direction of their advance along their parallel paths on the plate surface, with the cutting stream from nozzle 10 in a leading position with respect to the following cutting stream from nozzle 12; and these streams are directed obliquely against the plate surface during such advance, either in substantially parallel directions as illustrated by Fig. 5 or in divergent directions as illustrated by Fig. 6.

As stated hereinabove, the invention has wide application in respect to the preparation of the edges of relatively thick steel plates particularly for subsequent welding operations, by forming such edges with appropriate multi-faced surfaces, especially edges with a double bevel and an intermediate unbeveled nose face. However, in its widest purview the invention has possible application in the art of cutting metal where an auxiliary kerf is made in the scrap for preventing the dissipation of heat by conduction into the main body of scrap whether or not an exothermic reaction is set up between the cutting medium and the workpiece, and it is obvious that the invention is applicable to cutting operations involving various shapes and sizes of steel plates, plate members and other members, and that the same as described may be varied to include alternative metal cutting operations. Accordingly, since certain described procedures may be replaced in whole or in part by other procedures and certain features utilized in part, without departing from the spirit and scope of my invention, reference is therefore to be had to the appended claims for a definition thereof.

I claim:

1. A method of cutting a metal plate to form thereon a shaped edge composed of at least two angularly related faces, which method comprises concurrently advancing two oxygen cutting streams along adjacent parallel paths on the same surface of said plate while maintaining said cutting streams positioned relatively to each other to cut two mutually non-intersecting kerfs through said plate, to form one of such faces and also to provide a heated metal membrane between said two kerfs; and advancing another oxygen cutting stream behind and concurrently with said two cutting streams and along a path on said surface of said plate parallel to and laterally spaced from the portion of said surface between said adjacent parallel paths while angularly positioning said other cutting stream relatively to said two cutting streams to cut a kerf in said plate to form another of such faces and also to cut a kerf through said heated membrane and thereby inhibit deflection of said other cutting stream against the face previously formed by one of said two cutting streams.

2. A method of cutting a metal plate as defined in claim 1 wherein said two oxygen cutting streams are maintained spaced apart in the longitudinal direction of said adjacent paths.

3. A method of cutting a metal plate as defined in claim 1, wherein said two oxygen cutting streams are maintained in spaced relation longitudinally of said adjacent paths, to provide a leading cutting stream and a following cutting stream, said leading cutting stream being positioned and advanced to cut one of said non-intersecting kerfs through said plate to thereby first form one side of said membrane, and said following cutting stream being positioned and advanced to cut through said plate the other of said non-intersecting kerfs to thereby subsequently form said one of said faces and the opposite side of said membrane.

4. A method of cutting a metal plate as defined in claim 1, wherein said two oxygen cutting streams are directed obliquely against the same surface of said plate, and said other oxygen cutting stream is directed perpendicularly against said surface.

5. A method of cutting a metal plate as defined in claim 1, wherein said two oxygen cutting streams are directed obliquely and in substantially parallel directions against the same surface of said plate.

6. A method of cutting a metal plate as defined in claim 1, wherein said two oxygen cutting streams are directed obliquely and in divergent directions against the same surface of said plate.

7. A method of cutting a metal plate as defined in claim 1, wherein said two oxygen cutting streams are directed obliquely and in substantially parallel directions against the same surface of said plate, and said other oxygen cutting stream is directed perpendicularly against said surface.

8. A method of cutting a metal plate as defined in claim 1, wherein said two oxygen cutting streams are directed obliquely and in substantially parallel directions against the same surface of said plate, and said other oxygen cutting stream is directed obliquely against said surface.

9. A method of cutting a metal plate as defined in claim 1, wherein said two oxygen cutting streams are directed obliquely and in divergent directions against the same surface of said plate, and said other oxygen cutting stream is directed perpendicularly against said surface.

10. A method of cutting a metal plate to form thereon a shaped edge composed of three angularly related faces, which method comprises concurrently advancing two leading oxygen cutting streams along adjacent parallel paths on the same surface of said plate while maintaining said cutting streams positioned relatively to each other to cut two mutually non-intersecting kerfs through said plate, to form one of said three faces and also to provide a heated metal membrane between said two kerfs; and advancing two other oxygen cutting streams behind and concurrently with said two leading cutting streams and along paths on said surface of said plate parallel to and spaced from the portion of said surface between said adjacent parallel paths while angularly positioning said other cutting streams relatively to each other and relatively to said two leading cutting streams to cut kerfs in said plate to form the other two of said three faces and also to cut kerfs through said heated membrane and thereby inhibit deflection of cutting oxygen against the face previously formed by one of said two leading cutting streams.

11. A method of cutting a metal plate to form thereon a shaped edge composed of two angularly related faces, which method comprises concurrently advancing two oxygen cutting streams along adjacent parallel paths on the same surface of said plate while maintaining said cutting streams positioned relatively to each other to cut two mutually non-intersecting kerfs through said plate, to form one of said two faces and also to provide a heated metal membrane between said two kerfs; and advancing a third oxygen cutting stream behind and concurrently with said two cutting streams and along a path on said surface of said plate parallel to and spaced from the portion of said surface between said adjacent parallel paths while angularly positioning said third cutting stream relatively to said two cutting streams to cut a kerf in said plate to form the other of said two faces and also to cut a kerf through said heated membrane and thereby inhibit deflection of said third cutting stream against the face previously formed by one of said two cutting streams.

JOHN H. ROUNTREE.

REFERENCES CITED

The following references are of record in the file of this patent:

UNITED STATES PATENTS

| Number | Name | Date |
|---|---|---|
| 1,084,692 | Bucknam | Jan. 20, 1914 |
| 1,554,408 | Coberly | Sept. 22, 1925 |
| 1,787,247 | Grow | Dec. 30, 1930 |
| 2,146,266 | Moss | Feb. 7, 1939 |
| 2,184,562 | Rockefeller | Dec. 26, 1939 |
| 2,202,130 | Wagner | May 28, 1940 |
| 2,271,613 | Babcock et al. | Feb. 3, 1942 |
| 2,288,026 | Rea | June 30, 1942 |
| 2,293,853 | Rountree | Aug. 25, 1942 |

OTHER REFERENCES

Rockefeller, "Shaping Edges for Welding," Steel Magazine, March 11, 1940, pages 60, 61, 62, 64.